United States Patent [19]

Stevens

[11] Patent Number: 4,864,678
[45] Date of Patent: Sep. 12, 1989

[54] RELATING TO WINDSCREEN WIPER ARMS

[75] Inventor: Anthony Stevens, Leamington Spa, England

[73] Assignee: National Research Development Corporation, London, England

[21] Appl. No.: 218,133

[22] Filed: Jul. 13, 1988

[30] Foreign Application Priority Data

Jul. 13, 1987 [GB] United Kingdom ............... 8716422

[51] Int. Cl.$^4$ ............................................. B60S 1/32
[52] U.S. Cl. .................................................. 15/250.35
[58] Field of Search ........... 15/250.34, 250.35, 250.19, 15/250.2

[56] References Cited

U.S. PATENT DOCUMENTS 2,613,385 10/1952 Wylie ........................ 15/250.35 X
3,387,316 6/1968 Pearse ........................ 15/250.35 X
3,480,985 12/1969 Forster ........................... 15/250.35
4,318,201 3/1982 Rogers et al. ................... 15/250.35

Primary Examiner—Peter Feldman
Attorney, Agent, or Firm—Cushman, Darby & Cushman

[57] ABSTRACT

A flexible windscreen wiper arm (1) of unitary construction, having means (2, 3) at one end of the arm for attachment to a wiper blade, and means (6) at the other to engage a rotary driving spindle (8). Between the two ends of the arm is a region (12) capable of toggle action between two opposite and stable positions. When the socket (6) is in place over the spindle (8) and the toggle region is in one stable position, the socket grips the spindle and the blade will be angled so as to press the blade against a windscreen. In the other extreme position of the toggle, the arm is angled to lift the blade clear of the windscreen and the grip of the socket on the spindle is released, allowing removal of arm and blade from the spindle.

6 Claims, 2 Drawing Sheets

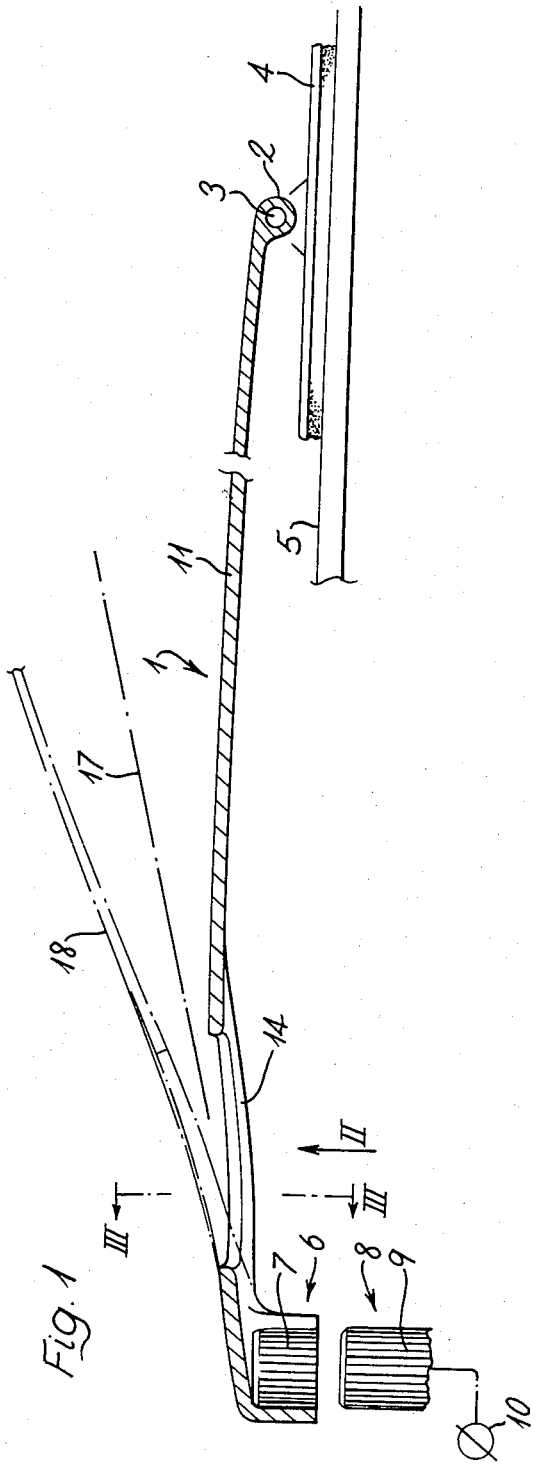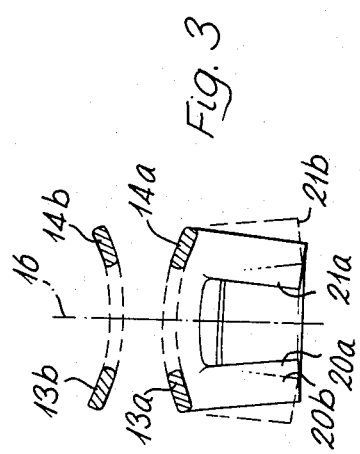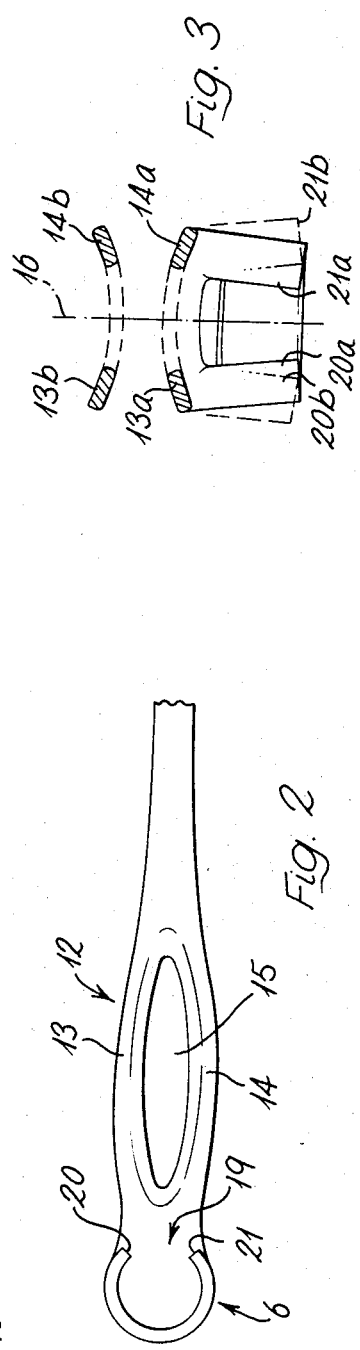

RELATING TO WINDSCREEN WIPER ARMS

This invention relates to windscreen wiper arms for automobile vehicles, that is to say to the arms that connect the wiper blades to the driving mechanism by which they are rotated to and fro.

To be commercially acceptable, a wiper arm must fulfil two requirements amongst others. Firstly it must be so designed that the blade is pressed firmly against the windscreen in use, and so that the arm itself is securely attached to the driving mechanism. Secondly it must be simple when the arm is not in use to move it to a second position in which the blade is well clear of the windscreen and can therefore easily be cleaned. The need to achieve these and other requirements reliably has led to the conventional windscreen wiper arm being a quite complex item, having many individual parts. To achieve both the firm blade/windscreen contact in use and the second cleaning position it has become customary to include two spring mechanisms, one provided by the material of the arm itself and the other by a separate coil spring. The presence of the coil spring has in turn required a channel-shaped structural item, which would otherwise be unnecessary, to mask and protect it. Furthermore attachment of the arm to the customary splined cylindrical driving spigot has been by way of a rigid and matching splined socket mounted at one end of the arm, and the paramount need for ensuring reliable engagement between the spigot and the socket in use has caused most arms to include, as yet a further component part, a spring-loaded catch that engages under the head of the spigot and that has to be deliberately drawn back if the arm and spigot are to be separated.

The present invention arises from the search for a simpler yet still reliable design, and results in particular from appreciating the possibility of a variable-geometry but unitary structure. By unitary I mean a structure without discontinuity, and without joints where flexure is intended.

The invention is a flexible windscreen wiper arm of unitary construction and adapted for connection to and oscillatory rotation by rotary driving mechanism, in which there are means at one end of the arm for connection to the driving mechanism, and means towards the other end of the arm for connecting it to a windscreen wiper blade, and in which between these two connecting means the arm includes a region capable of toggle action, whereby the arm has two stable configurations lying one to either side of the centre position of the toggle and is adapted in one of those configurations to act as a spring to exert pressure on the wiper blade. The toggle-action region may have dished configurations, of opposite curvatures, in the two stable positions.

The arm may be formed with an aperture which corresponds with the centre of the toggle action region.

The means of connection to the driving mechanism may comprise a generally-cylindrical and variable-geometry socket associated with the toggle-action region of the arm, whereby in one stable position of that region the section of the socket is reduced so as to grip the mechanism and in the other stable position of the arm the socket section is expanded so as to release the mechanism. That socket may be of "C"-shape when viewed in radial section relative to the axis of the oscillatory rotation, and the mouth of the "C" may face towards the opposite end of the arm.

The invention will now be described, by way of example, with reference to the accompanying drawings in which:

FIG. 1 shows a windscreen wiper arm in lengthwise section, the plane of the section including the axis of its driving spindle;

FIG. 2 is an underneath plan view taken in the direction of the arrow II in FIG. 1;

FIG. 3 is a section on the line III—III in FIG. 1, and

Figure 4:
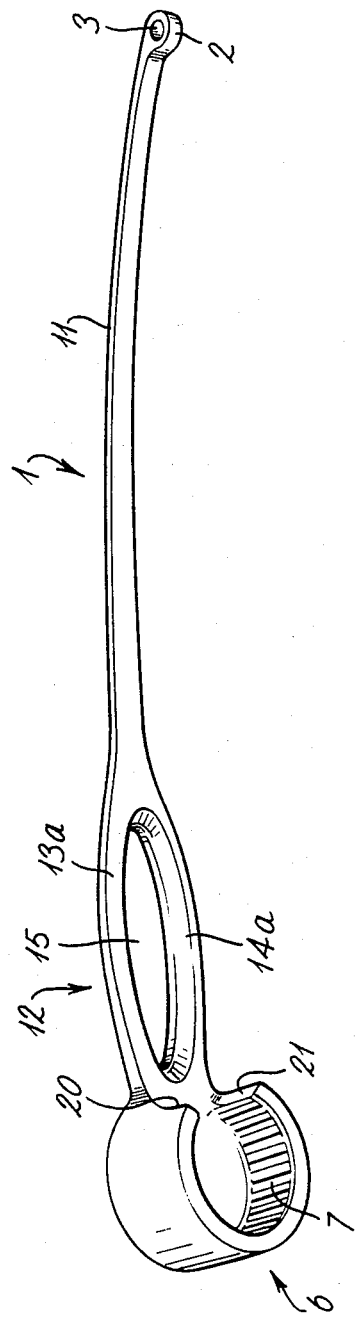
FIG. 4 is an underneath perspective view of such an arm.

The arm 1 is a unitary structure and can advantageously be moulded, cast, pressed or otherwise formed as a one-piece unit from any material of suitable strength and resilience; the arm actually shown in FIG. 4 may for instance be formed by moulding a thermosetting epoxy or polyester resin, filled with glass fibres, between dies. At one end of the arm a lug 2 formed with a hole 3 provides in this example the means of connection to a windscreen wiper blade 4 operating on a windscreen 5, the latter two parts being indicated in outline only in FIG. 1. At the other end of the arm a socket 6, formed with internal splines 7, provides in this example the means of connection to oscillatory rotary driving mechanism in the form of a cylindrical driving spindle 8 formed with corresponding external splines 9, as shown in outline in FIG. 1. The engagement between splines 7 and 9 prevents mutual rotation between socket 6 and spindle 8 when they are thus connected. Between lug 2 and socket 6 the arm comprises a substantial length 11 of rectangular section, the area of which section increases gradually with distance from the lug and a region 12 adjacent the socket 6 where the arm splits into two limbs 13 and 14 separated by a central aperture 15. As seen in FIG. 4 and at 13a and 14a in FIG. 3, the surfaces of limbs 13 and 14 are inclined to the line 16 so that region 12 of the arm has a dished shaped about line 16, with the mouth—i.e. the concave face—of the dish opening downwardly, that is to say in the same direction as the mouth of socket 6. The combination of this dished shape and the resilient material holds the arm in the stable configuration shown in full lines in FIG. 1, with the lug 2 at the tip of the arm resiliently biassed downwardly relative to socket 6. This is the position which the arm should adopt in use, so that region 12 and length 11 together act as a spring to press the wiper blade 4 into firm contact with the windscreen 5. If however the tip of the arm is bent upwards, against the resistance offered by region 12, a condition (indicated by broken line 17, FIG. 1) will be reached where a toggle action operates and the dished configuration of region 12 reverses, so that the surfaces of limbs 13 and 14 become angled to line 16 as shown at 13b and 14b in FIG. 3, and the mouth of the dished configuration of region 12 now points in the opposite direction to the mouth of socket 6. Arm 1 is therefore biassed to the upper position shown at 18 in FIG. 1, in which the lug 2 at the top of the arm will be well separated from the windscreen 5 and will therefore expose the blade 4 for cleaning.

According to a further feature of the invention the socket 6 is not a complete cylinder but is "C"-shaped as seen in FIGS. 2 and 4, with the mouth 19 of the "C" facing down the length of the arm 1. It will be readily apparent from the geometry of the adjacent region 12 of the arm, as seen particularly in FIGS. 3 and 4, that when limbs 13 and 14 are angled as at 13a and 14a, the extremities 20 and 21 of the "C"-shape of socket 6 are angled as at 20a and 21a in FIG. 3, and therefore tend to grip spindle 8 and so secure the arm on the spindle when in use. However when the arm is moved to position 18 and limbs 13 and 14 take up positions 13b and 14b, extremities 20 and 21 take up positions 20b and 21b as shown in FIG. 3, so releasing the grip of socket 6 upon spindle 8 and allowing the entire arm to be removed from the spindle to facilitate the cleaning of the blade 4. To return the blade to its working position and simultaneously engage the arm with spindle 8, it is only necessary to fit socket 6 over spindle 8, taking care to align the arm 1 with the desired position on its sweep of action, and then while holding the socket in position over the spindle to press the arm 1 downwards until limbs 13 and 14 both over-centre back to their original positions 13a and 14a, in which socket 6 positively grips the spindle 8 and the blade 4 is spring-loaded against the windscreen 5.

I claim:

1. A flexible windscreen wiper arm, adapted for connection to a windscreen wiper blade and for connection to and oscillatory rotation by rotary driving mechanism, and comprising:

first and second opposite ends to said arm; means towards said first end of said arm for connection in use to said driving mechanism;

means towards said second end of said arm for connecting it in use to said windscreen wiper blade;

a region capable of toggle action between said two connecting means, said toggle action having an unstable toggle-centre position and first and second stable configurations lying one to either side of said toggle-centre position, whereby said arm is adapted to use and in said first stable configuration to act as a spring to exert pressure on said wiper blade.

2. A windscreen wiper arm according to claim 1 in which said toggle-action region has dished configurations, of opposite curvatures, in said two stable configurations.

3. A windscreen wiper arm according to claim 1 in which said arm is formed with an aperture which corresponds with said toggle-action region.

4. A windscreen wiper arm according to claim 1 in which said means for connection to said rotary driving mechanism comprises a generally-cylindrical and variable-geometry socket associated with said toggle-action region of the arm, whereby in said first stable configuration of said region the section of said socket is reduced so as to grip said rotary driving mechanism, and in said second stable configuration of the arm said socket section is expanded so as to release said mechanism.

5. A windscreen wiper arm according to claim 4 in which said socket is of "C"-shape when viewed along the axis of said oscillatory rotation.

6. A windscreen wiper arm according to claim 5 in which the mouth of said "C" faces towards said second end of said arm.

* * * * *